United States Patent
Dean et al.

(10) Patent No.: US 6,618,696 B1
(45) Date of Patent: Sep. 9, 2003

(54) METHOD OF TESTING AND SIMULATING COMMUNICATION EQUIPMENT OVER MULTIPLE TRANSMISSION CHANNELS

(75) Inventors: Richard A. Dean, Columbia, MD (US); Steven William Roberts, Columbia, MD (US); Mark George Jacobs, Baltimore, MD (US); Ronald E. Krebs, Bel Air, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 0 days.

(21) Appl. No.: 09/332,129

(22) Filed: Jun. 14, 1999

(51) Int. Cl.[7] .................. G06G 7/48; G06F 17/10; G06F 7/60; H04B 17/00; H04B 3/46

(52) U.S. Cl. .................. 703/13; 703/2; 703/6; 380/33; 375/225; 702/196

(58) Field of Search ............... 703/6, 2, 13; 380/33; 375/225; 702/196

(56) References Cited

U.S. PATENT DOCUMENTS

| | | | |
|---|---|---|---|
| 3,982,244 A | | 9/1976 | Ward et al. |
| 4,144,412 A | * | 3/1979 | Ito et al. .................. 455/450 |
| 5,794,128 A | | 8/1998 | Brockel et al. |
| 5,812,558 A | | 9/1998 | Rotz et al. |
| 5,862,362 A | | 1/1999 | Somasegar et al. |
| 6,163,698 A | * | 12/2000 | Leitch et al. ............... 455/434 |

OTHER PUBLICATIONS

Turin, W. "Throughput analysis of the go–back–N protocol in fading radio channels". IEEE Journal on Selected Areas in Communications. May 1999. Vol 17, Issue 5. pp. 881–887.*

Balaban et al. "Performance Evaluation of the Reverse Link of a CDMA Cellular System." IEEE Global Telecommunications Conference, Nov. 8–12, 1998. Sydney, Australia. vol. 1, pp. 231–236.*

Yuan, Dongfeng "The Modeling for the Mobile Communication Channel". IEEE Region 10 Conference on Computer and Communication Systems, TENCON '90. Sep. 24–27, 1990. pp. 81–85.*

Sivaprakasam et al. "An Equivalent Markov Model for Burst Errors in Digital Channels". IEEE Transactions on Communications. Feb.–Apr. 1995, vol. 43, Issue 2, Part 3. pp. 1347–1355. Published Apr. 24, 1995.*

(List continued on next page.)

*Primary Examiner*—William Thomson
*Assistant Examiner*—Ayal I. Sharon
(74) *Attorney, Agent, or Firm*—Robert D. Morelli

(57) ABSTRACT

The present invention is a method of simulating the effects of a plurality of channels on a signal that includes the steps of acquiring a state transition matrix for each of said plurality of channels; acquiring an error matrix for each of said plurality of channels; selecting the first channel to be simulated; assuming that the signal is in a particular state; receiving the signal; generating a first number; determining the state to which the signal transitions; transitioning the signal to the state determined in the last step; generating a second number; determining what errors, if any, to inject into the signal by comparing the second number to entries in the column of the error matrix of the corresponding channel that matches the state of the signal; if one of the errors determined in the last step is lost signal then discarding the signal, not injecting any other error into the signal, selecting another channel if the user desires, assuming that the next signal selected is in the same state to which the previous signal transitioned, returning to the fifth step if another channel is selected, and transmitting the signal if another channel is not selected; and injecting the errors determined in the tenth step into the signal, selecting another channel if the user desires, returning to the fifth step if another channel is selected, assuming that the next signal selected is in the same state to which the previous signal transitioned, and transmitting the signal if another channel is not selected.

33 Claims, 3 Drawing Sheets

OTHER PUBLICATIONS

Pimentel et al. "Enumeration of Markov chains and burst error statistics for finite state channel models". IEEE Transactions on Vehicular Technology. Mar. 1999, vol. 48, Issue 2. pp. 415–428.*

Kuhn, Frank J. "A real time error correcting data transmission system treated as a Markov process". ACM/CSC–ER Proceedings of the 21st National Conference, 1966. pp. 453–463.*

Yuan, Dongfeng. "Channel Modeling and Performance Estimation of Block Codes with Periodic and Changeable Interleaving Degree in the Digital Mobile Channel". TENCON '91—IEEE Region 10 Int'l Conference on EC3 Systems. Aug. 28–30, 1991. vol. 3. pp. 129–133.*

Stark, Henry and John W. Woods. Probability, Random Processes, and Estimation Theory for Engineers, 2nd Edition. Prentice–Hall, Inc. 1994. (Background information on the following topics: "Markov Random Processes", pp. 391–399, and Vector Processes an.*

Wang, Duanyi et al. "Application of Markov model in mobile communication channel". 1994 IEEE–IMS Workshop on Information Theory and Statistics. 1994. p. 85.*

Zorzi, M. et al. "Error Statistics in Data Transmission Over Fading Channels". IEEE Transactions on Communications. Nov. 1998. vol. 46, Issue 11. pp. 1468–1477.*

\* cited by examiner

| PRESENT STATE | PROBABLILITY OF TRANSITIONING TO STATE | | |
|---|---|---|---|
| | NORMAL | HANDOVER | SHADOW |
| NORMAL | 0.99 | 0.009 | 0.001 |
| HANDOVER | 0.99 | 0.009 | 0.001 |
| SHADOW | 0.09 | 0.01 | 0.9 |

FIG. 2

| ERROR | PROBABLILITY OF ERROR FOR STATE | | |
|---|---|---|---|
| | NORMAL | HANDOVER | SHADOW |
| LOST SIGNAL | 0.0 | 0.5 | 0.0 |
| ERROR SIGNAL | 0.0 | 0.05 | 0.0 |
| EXTRA SIGNAL | 0.0 | 0.4 | 0.0 |
| RANDOM ERROR | 0.000001 | 0.003 | 0.007 |
| PHASE SHIFT | 0.0 | 0.05 | 0.0 |
| OUT OF ORDER | 0.0 | 0.0 | 0.0 |
| DELAY | 0.0001 | 0.002 | 0.005 |

FIG. 3

METHOD OF TESTING AND SIMULATING COMMUNICATION EQUIPMENT OVER MULTIPLE TRANSMISSION CHANNELS

FIELD OF THE INVENTION

The present invention relates, in general, to testing and simulating communication equipment and, in particular, to testing and simulating communication equipment over multiple transmission channels.

BACKGROUND OF THE INVENTION

Due to the complexity and expense of producing communication equipment, producers often simulate their product prior to manufacture. Such simulation is often complex, does not allow for the simulation of more than one communication channel, does not allow a user to easily simulate a number of user-definable configurations and communication channels, does not run in both real-time and non-real-time, does not work in conjunction with actual communication equipment, and does not run on an inexpensive personal computer but on expensive specialized equipment. All of these shortcomings are addressed by the present invention.

U.S. Pat. No. 3,982,244, entitled "RADAR ANTENNA, MONOPULSE COMPARATOR NETWORK AND MIXER SIMULATOR," discloses a device for simulating a radar tracking system and the components that make up the same. U.S. Pat. No. 3,982,244 includes a random noise generator for simulating the effects of noise on a radar tracking system and a number of simulators for simulating various effects on a radar signal caused by the target, receipt of numerous copies of the signal, clutter, and electronic counter measures. U.S. Pat. No. 3,982,244 simulates the effects on a signal that travels from one point to another and does not simulate the effects on a signal that travels over multiple channels as does the present invention. Also, U.S. Pat. No. 3,982,244 does not give the user as many options in defining the simulation as does the present invention. U.S. Pat. No. 3,982,244 is hereby incorporated by reference into the specification of the present invention.

U.S. Pat. No. 5,794,128, entitled "APPARATUS AND PROCESSES FOR REALISTIC SIMULATION OF WIRELESS INFORMATION TRANSPORT SYSTEMS," discloses a rather complex device for and method of simulating a wireless communication system. U.S. Pat. No. 5,794,128 models the physical layers and the link layers of the communication system whereas the present invention does not. Also, U.S. Pat. No. 5,794,128 does not give the user as many options in defining the simulation as does the present invention. U.S. Pat. No. 5,794,128 is hereby incorporated by reference into the specification of the present invention.

U.S. Pat. No. 5,812,558, entitled "DEVICE AND METHOD FOR GENERATING MULTIPLEXED SIGNALS WITH REAL TIME INPUTS FOR TESTING VOICE GRADE CHANNELS IN A DEMULTIPLEXER," discloses a device for and method of generating a signal for testing demultiplexing equipment in a communication system. U.S. Pat. No. 5,812,558 does not simulate and test the effects of multiple communication channels on a transmission as does the present invention. U.S. Pat. No. 5,812,558 is hereby incorporated by reference into the specification of the present invention.

U.S. Pat. No. 5,862,362, entitled "NETWORK FAILURE SIMULATOR," discloses a method of simulating the effects of a software program being disconnected from the computer on which the software program should be running. U.S. Pat. No. 5,862,362 does not simulate and test the effects of multiple communication channels on a transmission as does the present invention. U.S. Pat. No. 5,862,362 is hereby incorporated by reference into the specification of the present invention.

SUMMARY OF THE INVENTION

It is an object of the present invention to simulate multiple communication channels in a non-complex manner and to allow a user to define the configuration and the number of communication channels.

It is another object of the present invention to simulate multiple communication channels in both real-time and non-real-time on a personal computer and allow the inclusion of actual communication equipment.

The present invention is a method of simulating the effects of a plurality of communication channels on a signal transmitted therein. The present invention allows an inexpensive personal computer to function as a multi-network communication channel simulator to predict how various communications equipments will perform over a variety of industry defined and user defined networks. The present invention allows a user to cascade a number of communications channels together in either real time or non-real-time to predict the effects of multiple channels on a particular piece of equipment. The errors induced in the signal by each channel are independent and cumulative. Thus, the present invention predicts the end-to-end channel effects that a signal encounters as it traverses the channels.

The first step is acquiring a state transition matrix for each communication channel that a user desires to simulate.

The second step is acquiring an error matrix for each channel.

The third step is selecting the first channel to simulate.

The fourth step is assuming that the signal is in a particular state.

The fifth step is receiving the signal, or a part thereof, in real-time or in non-real-time.

The sixth step is generating a first number between 0 and 1, preferably a random number.

The seventh step is determining the state to which the signal, or part thereof, transitions by comparing the first number to the appropriate row in the state transition matrix.

The eighth step is transitioning the signal, or part thereof, to the state determined in the seventh step.

The ninth step is generating a series of numbers, where each number in the series is between 0 and 1, preferably a random number, and where each number in the series corresponds to an error that may be injected into the signal.

The tenth step is determining what errors, if any, to inject into the signal, or part thereof, by comparing each number in the series of numbers generated in the ninth step to its corresponding entry in the column of the error matrix that corresponds to the state of the signal. The errors include lost signal, error signal, extra signal, random error, phase shift, signal out of order, and channel delay. Multiple errors may be injected into the signal except when the lost-signal error is to be injected into the signal, or part thereof. When the lost-signal error is to be injected into the signal, or part thereof, no other error is injected into the signal, or part thereof.

If one of the errors determined in the tenth step is lost signal then the eleventh step is discarding the signal, not injecting any other error into the signal, selecting another channel if the user desires, assuming that the next signal selected is in the same state to which the previous signal transitioned, returning to the fifth step if another channel is selected, and transmitting the signal if another channel is not selected. Otherwise, the twelfth step is injecting the errors determined in the tenth step into the signal, selecting another channel if the user desires, returning to the fifth step if another channel is selected, assuming that the next signal selected is in the same state to which the previous signal transitioned, and transmitting the signal if another channel is not selected.

The signal resulting from the eleventh step or the twelfth step may be transmitted to communications equipment in real-time or non-real time or to a file in real-time or non-real-time.

All of the error injected into the signal may be recorded in total, by error type, and on a per channel basis for generating various error statistics.

BRIEF DESCRIPTION OF THE DRAWINGS

FIG. 2 is a table of one possible state transition matrix; and

FIG. 3 is a table of one possible error matrix;

DETAILED DESCRIPTION

Figure 1:
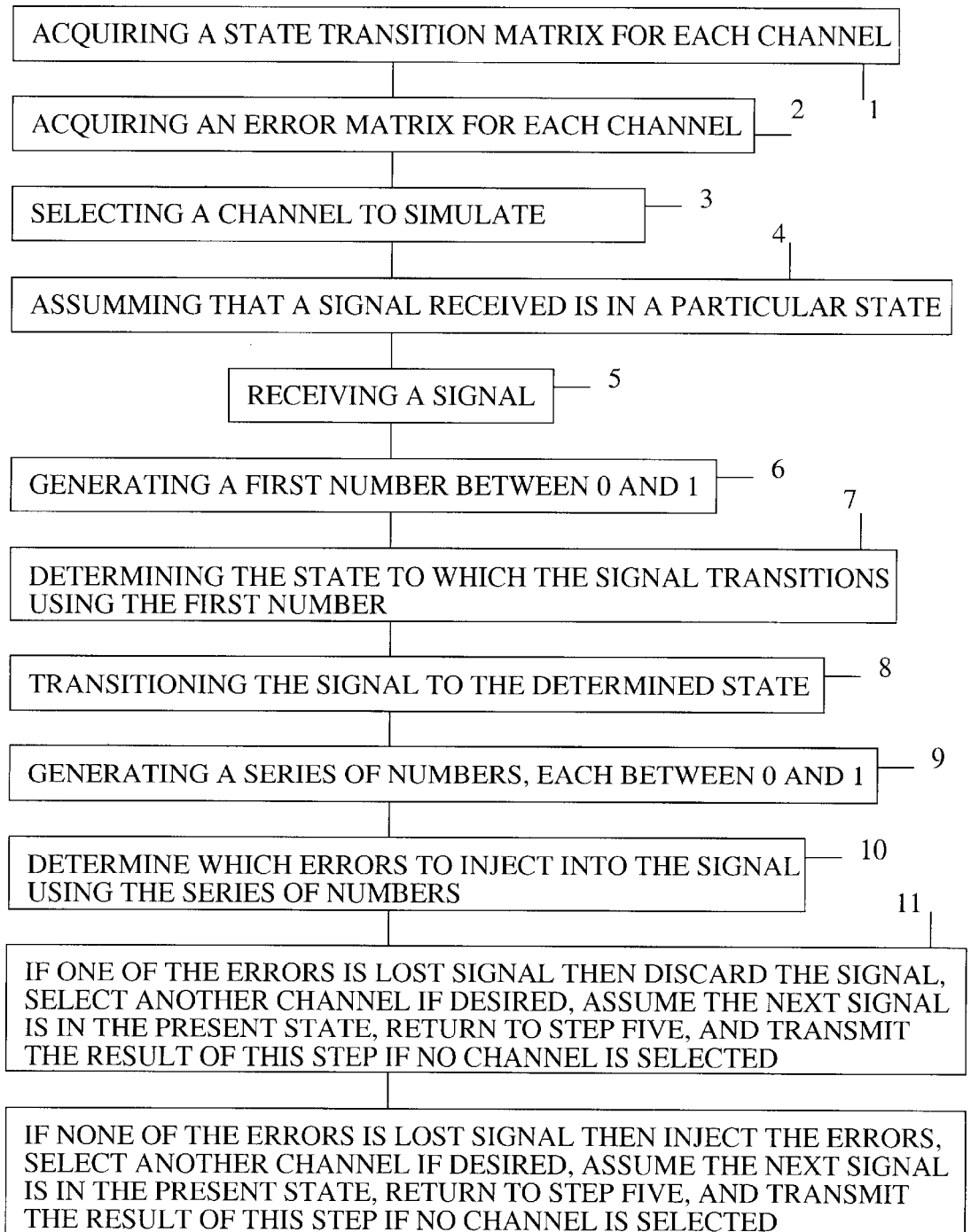
FIG. 1 is a list of the steps of the present invention.

The present invention is a method of simulating the effects of a plurality of communication channels on a signal transmitted therein. The present invention allows an inexpensive personal computer to function as a multi-network communication channel simulator to predict how various communications equipments will perform over a variety of industry defined and user defined networks. The present invention allows a user to cascade a number of communications channels together in either real time or non-real-time to predict the effects of multiple channels on a particular piece of equipment. The errors induced in the signal by each channel are independent and cumulative. Thus, the present invention predicts the end-to-end channel effects that a signal encounters as it traverses the channels.

FIG. 1 is a list of the steps of the present invention.

The first step 1 is acquiring a state transition matrix for each communication channel that a user desires to simulate. The possible channels may include PSTN, ISDN, ATM, TCP/IP, IS-95, IS-36, AMPS, GSM, Globalstar, and Iridium. For real-time simulation, the acceptable data rates may include 300 bps, 600 bps, 1200 bps, 2400 bps, 4800 bps, 9600 bps, and 19200 bps.

Each row in the state transition matrix represents a state that the signal may be in while in one of the channels. The state transition matrix contains the probabilities that the signal, or any subpart thereto, will transition from one state to another state. Any number of states may be used in the present invention, and each channel may have a different number of states. For example, a cellular channel may have three states (i.e, normal, handover, and shadow). The normal state may represent the normal steady state which is relatively error free. The handover state may represent the cellular terminal being handed off between two cell towers. The shadow state may represent a state of increased errors due to multipath or operating on the fringes of the cellular network. Each column in the state transition matrix represents a state to which the signal may transition while in one of the channels. The values contained in the state transition matrix may be one fixed set of numbers or they may be a function of some user-definable condition (e.g., time, physical location, weather, etc.). The state transition matrix may be generated by the user or it may be received from somewhere else.

FIG. 2 is a table that represents one possible state transition matrix. Note that the values contained in each row in the table of FIG. 2 follows a probability theory known as the Markov model by summing to one. The Markov model was developed at the turn of the twentieth century by Russian probabilist Andrey Andreyevich Markov. A Markov model describes a system in which future states are completely determined by the present state, regardless of how that present state arose.

The second step 2 is acquiring an error matrix for each channel. Each row in the error matrix represents an error that may occur in the signal while in one of the channels. Each column in the state transition matrix represents a state that the signal may be in while in one of the channels. Each entry in the error matrix represents a probability of occurrence of the error of the corresponding row. Each entry is a threshold at or above which the corresponding error occurs and do not follow the Markov model. The values contained in the error matrix may be one fixed set of numbers or they may be a function of some user-definable condition (e.g., time, physical location, weather, etc.). The error matrix may be generated by the user or it may be received from somewhere else.

FIG. 3 is a table of one example of an error matrix. The errors shown in the rows of FIG. 3 include lost signal, error signal, extra signal, random error, phase shift, and out of order. Other types of errors are possible. The errors may occur in the signal as a whole or in any subpart thereof. For example, the signal may be transmitted in frames or in bytes. Therefore, the errors may occur at the frame level or at the byte level.

A lost signal, or subpart thereof, is defined as the loss of the entire signal or subpart. An error signal, or subpart thereof, is defined as replacing the current signal or subpart with a signal or subpart of random data. The extra signal, or subpart thereof, is defined as an extra signal or subpart of random data inserted into the signal or subpart. A random error is defined as the introduction of random bit errors into the signal or subpart. A phase shift is defined as the shifting of the signal, or subpart, boundary by a random number of bytes. An out-of-order-error is defined as delaying the signal, or subpart thereof, a user-definable amount to produce an out of order signal or subpart.

The third step 3 is selecting the first channel to simulate. The possible channels types include cellular, satellite, digital, and analog. Examples of these types of channels include PSTN, ISDN, ATM, TCP/IP, IS-95, IS-36, AMPS, GSM, Globalstar, and Iridium. For real-time simulation, the acceptable data rates may include 300 bps, 600 bps, 1200 bps, 2400 bps, 4800 bps, 9600 bps, and 19200 bps.

The fourth step 4 is assuming that the signal, or subpart thereof, is in a particular state (e.g., normal, handover, or shadow).

The fifth step 5 is receiving the signal. The signal may be received as a whole or it may be received in subparts. The subparts include frames, bytes, and bits. The signal, or subpart thereof, may be a signal generated by an actual piece of communications equipment connected to the present invention or the signal may be a reasonable facsimile of a signal generated by an actual piece of communications equipment (e.g., a file copy of a possible signal). The signal, or subpart thereof, may be received in real-time or in non-real-time. That is, the signal, or subpart thereof, may be received from (1) the actual piece of communications equipment that would generate the signal, or subpart, at a real-time rate, (2) a file at a real time rate, (3) the actual piece of communications equipment that would generate the signal, or subpart, at a non-real-time rate, or (4) a file at a non-real-time rate.

Real-time mode allows the user to connect two, or more, pieces of communications equipment (i.e., the transmitter and the receiver) to the invention to test the communications equipment over various combinations of cascaded channels. The present invention may be operated in full duplex mode, half duplex mode, or broadcast mode.

In non-real-time mode from a file, the signal, or subpart thereof, may be read from a user-selected binary file. By allowing the use of files, the present invention may allow the use of pre-stored test data. Such data insures identical conditions from test to test and enables the user to simulate equipment that may not exist yet.

The sixth step 6 is generating a first number between 0 and 1. In the preferred embodiment, the first number generated is a random number.

The seventh step 7 is determining the state to which the signal, or part thereof, transitions by comparing the first number to entries in the row of the state transition matrix of the corresponding channel that matches the state of the signal. For example, if the signal is in the normal state then compare the number generated in the sixth step 6 to the entries in the row of the state transition matrix that correspond to the normal state. For example, if the signal is in the normal state then the number generated in the sixth step 6 will be compared to the entries in the row corresponding to the normal state. For the entries of FIG. 2, compare the number generated in the sixth step 6 to 0.99, which represents the probability that the signal will remain in the normal state, 0.009, which represents the probability that the signal will transition to the handover state, and 0.001, which represents the probability that the signal will transition to the shadow state. The detailed steps of determining the state to which the signal, or part thereof, transition are as follows.

Establish an upper threshold for each state to which the signal may transition by adding the entry of interest in the state transition matrix to entries to the left of the entry of interest. For the entries in the normal row of FIG. 2, the upper threshold for the probability of remaining in the normal state is 0.99 since there are no numbers to the left of 0.99 and, therefore, no numbers are added to 0.99. The upper threshold for transitioning to the handover state is 0.99+0.009=0.999. The upper threshold for transitioning to the shadow state is 0.99+0.009+0.001=1.

Next, establish a lower threshold for each state to which the signal may transition as just above the upper threshold of the state to the immediate left of the state of interest in the state transition matrix, where the lower threshold is 0 if there is no entry to the left of the entry of interest. So, if the number generated in the sixth step 6 is 0 to 0.99 then the signal will remain in the normal state. If the number generated in the sixth step 6 is greater than 0.99 and less than or equal to 0.999 then the signal will transition to the handover state. If the number generated in the sixth step 6 is greater than 0.999 and less than or equal to 1 then the signal will transition to the shadow state. The other rows of the state transition matrix follow along the same lines as did this example using the normal row.

Next, compare the first number to the lower threshold and upper threshold for each state to which the signal may transition.

Next, determine to which state the signal transitions by comparing the number generated in the sixth step 6 to the ranges described above. For example, if the number generated in the sixth step 6 is 0.75 and the state transition matrix is as in FIG. 2 then the signal remains in the normal state. If the number generated in the sixth step 6 is 0.993 then the signal transitions to the handover state. If the number generated in the sixth step 6 is 0.9992 then the signal transitions to the shadow state.

The eighth step 8 is transitioning the signal, or part thereof, to the state determined in the seventh step 7.

The ninth step 9 is generating a series of numbers, where each number in the series is between 0 and 1, and where each number in the series corresponds to an error that may be injected into the signal. In the preferred embodiment, the second number is a random number.

The tenth step 10 is determining what errors, if any, to inject into the signal, or part thereof, by comparing each number in the series generated in the ninth step 9 to its corresponding entry in the error matrix. If the number is the series is less than its corresponding column entry in the error matrix then that error is injected into the signal, or subpart. Otherwise, the error is not injected into the signal, or subpart. However, if the error of lost signal, or lost subpart, is to be injected into the signal, or subpart, then no other error is injected into the signal, or subpart, no matter how the numbers in the series corresponding to the other errors compare to their corresponding column entries in the error matrix.

As an example of the operation of the ninth step 9 and the tenth step 10, assume that the signal is in the handover state, that there are eight possible errors that may be injected into the signal (e.g., lost signal, error signal, extra signal, random error, phase shift, signal out of order, and signal delay), and the error matrix is as depicted in FIG. 3. Other types of errors are possible. If an error matrix different from the one depicted in FIG. 3 is required, the error matrix is changed accordingly. Next, as required by the ninth step 9, eight numbers are generated (e.g., 0.6, 0.04, 0.5, 0.002, 0.06, 0.1, and 0.001). Next, as required by the tenth step 10, each number in the series is compared to one of the entries in the column of the error matrix that corresponds to the state of the signal (e.g., the handover state in this example) to determine which errors, if any, should be injected into the signal, or subpart thereof. In the preferred embodiment, the first number in the series is compared to the top-most column entry, the second number in the series is compared to the second-top-most entry, and so on. However, any other suitable order of comparison may be used. For the series of numbers listed above and the error matrix in FIG. 3, the lost-signal error should not be injected into the signal because 0.6 is greater than 0.5; the error-signal error should be injected into the signal because 0.04 is less than 0.05; the extra-signal error should not be injected into the signal because 0.5 is greater than 0.4; the random error should be injected into the signal because 0.002 is less than 0.003; the phase-shift error should not be injected into the signal because 0.06 is greater than 0.05; the signal-out-of-order error should not be injected into the signal because 0.1 is greater than 0.0; and the signal-delay error should be injected into the signal because 0.001 is less than 0.002.

If one of the errors determined in the tenth step 10 is lost signal then the eleventh step 11 is discarding the signal, not injecting any other error into the signal, selecting another channel if the user desires, assuming that the next signal selected is in the same state to which the previous signal transitioned, returning to the fifth step 5 if another channel is selected, and transmitting the signal if another channel is not selected. Otherwise, the twelfth step 12 is injecting the errors determined in the tenth step 10 into the signal, selecting anotherchannel if the user desires, returning to the fifth step 5 if another channel is selected, assuming that the next signal selected is in the same state to which the previous signal transitioned, and transmitting the signal if another channel is not selected.

The signal resulting from the eleventh step 11 or the twelfth step 12 may be transmitted to communications equipment in real-time or non-real time or to a file in real-time or non-real-time.

All of the error injected into the signal may be recorded in total, by error type, and on a per channel basis for generating various error statistics.

What is claimed is:

1. A method of simulating the effects of a plurality of channels on a signal, comprising the steps of:

a) acquiring a state transation matrix for each of said plurality of channels, where each row in the state transition matrix represents a signal state, where each column in the state transition matrix represents a transition state, where each entry in the state transition matrix represents a probability of transitioning from state to state, and where the entries in a particular row in the state transition matrix sum to one;

b) acquiring an error matrix for each of said plurality of channels, where each row in the error matrix represents a signal error, where each column in the error matrix represents a signal state, and where each entry in the error matrix represents a probability of occurrence of the corresponding signal error while the signal is in the corresponding signal state;

c) selecting one of said plurality of channels;

d) selecting one of the states as the state of the signal;

e) receiving the signal;

f) generating a first random number between 0 and 1;

g) determining the state to which the signal transitions by comparing the first random number to entries in the row of the state transition matrix of the corresponding channel that matches the state of the signal;

h) transitioning the state of the signal to the state determined in the last step;

i) generating a series of random numbers, where each random number in the series is between 0 and 1, and where each random number in the series corresponds to a signal error;

j) determining what errors, if any, to inject into the signal by comparing each number in the series of random numbers to its corresponding entry in the column of the error matrix that corresponds to the state of the signal, wherein the errors include lost signal, replacement of the signal with another signal, adding an extra signal to the signal, replacing a bit in the signal with an error bit, shifting the phase of the signal, misreading the signal, and channel delay;

k) if one of the errors determined in the last step is a lost signal then discarding the signal, not injecting any other error into the signal, selecting another of said plurality of channels if initiated by user, setting the state of the next signal selected to the state to which the previous signal transitioned, returning to step (e) if another channel is selected, and transmitting the signal if another channel is not selected; and l) injecting the errors determined in step (j) into the signal, selecting another channel if initiated by user, returning to step (e) if another channel is selected, setting the state of the next signal selected to the same state to which the previous signal transitioned, and transmitting the signal if another channel is not selected.

2. The method of claim 1, wherein the step of acquiring a state transition matrix comprises the step of acquiring a state transition matrix having entries selected from a group of entries consisting of values that vary with time, values that vary by location, and values that vary by weather conditions.

3. The method of claim 1, wherein the step of acquiring an error matrix comprises the step of acquiring an error matrix having entries selected from a group of entries consisting of values that vary with time, values that vary by location, and values that vary by weather conditions.

4. The method of claim 1, wherein the step of determining the state to which the signal transitions is comprised of the steps of:

a) establishing an upper threshold for each state to which the signal may transition by adding the entry of interest in the state transition matrix to entries to the left of the entry of interest;

b) establishing a lower threshold for each state to which the signal may transition as just above the upper threshold of the state to the immediate left of the state of interest in the state transition matrix, where the lower threshold is 0 if there is no entry to the left of the entry of interest;

c) comparing the first random number to the lower threshold and upper threshold for each state to which the signal may transition; and d) determining that the signal transition to the state having its lower threshold and upper threshold encompassing the first random number.

5. The method of claim 1, further comprising the steps of:

a) recording the number and type of errors injected into the signal per channel; and b) generating error statistics based on the result of step (a).

6. The method of claim 1, wherein the step of selecting one of said plurality of channels is comprised of the step of selecting a channel from the group of channels consisting of cellular, satellite, digital, and analog.

7. The method of claim 1, wherein the step of acquiring a state transition matrix for each of said plurality of channels is comprised of the step of generating the state transition matrix.

8. The method of claim 1, wherein the step of acquiring an error matrix for each of said plurality of channels is comprised of the step of generating the error matrix.

9. The method of claim 1, wherein the step of acquiring a state transition matrix for each of said plurality of channels is comprised of the step of receiving the state transition matrix.

10. The method of claim 1, wherein the step of acquiring an error matrix for each of said plurality of channels is comprised of the step of receiving the error matrix.

11. The method of claim 1, wherein the step of one of the states as the state of the signal is comprised of selecting a state from the group of states consisting of a normal state, a handover state, and a shadow state.

12. The method of claim 1, wherein the step of receiving the signal is comprised of the step of receiving the signal in frames.

13. The method of claim 1, wherein the step of receiving the signal is comprised of the step of receiving the signal in bytes.

14. The method of claim 1, wherein the step of receiving the signal is comprised on the step of receiving the signal in real time.

15. The method of claim 1, wherein the step of receiving the signal is comprised of the step of receiving the signal in non-real time.

16. The method of claim 1, wherein the step of receiving the signal is comprised on the step of receiving the signal from communications equipment.

17. The method of claim 1, wherein the step of receiving the signal is comprised of the step of receiving the signal from a file.

18. The method of claim 1, wherein the step of transmitting the signal is comprised of the step of transmitting the signal in real time.

19. The method of claim 1, wherein the step of transmitting the signal is comprised of the step of transmitting the signal in non-real time.

20. The method of claim 1, wherein the step of transmitting the signal is comprised of the step of transmitting the signal to communications equipment.

21. The method of claim 1 wherein the step of transmitting the signal is comprised of the step of transmitting the signal to a file.

22. The method of claim 2, wherein the step of acquiring an error matrix comprises the step of acquiring an error matrix having entries selected from a group of entries consisting of values that vary with time, values that vary by location, and values that vary by weather conditions.

23. The method of claim 22, wherein the step of determining the state to which the signal transitions is comprised of the step of:

a) establishing an upper threshold for each state to which the signal may transition by adding the entry of interest in the state transition matrix to entries to the left of the entry of interest;

b) establishing a lower threshold for each state to which the signal may transition as just above the upper threshold of the state to the immediate left of the state of interest in the state transition matrix, where the lower threshold is 0 if there is no entry to the left of the entry of interest;

c) comparing the first random number to the lower threshold and upper threshold for each state to which the signal may transition; and d) determining that the signal transition to the state having its lower threshold and upper threshold encompassing the first random number.

24. The method of claim 23, further comprising the steps of;

a) recording the number and type of errors injected into the signal per channel; and b) generating error statistics based on the result of step (a).

25. The method of claim 24, wherein the step of selecting one of said plurality of channels is comprised of the step of selecting a channel from the group of channels consisting of cellular, satellite, digital, and analog.

26. The method of claim 25, wherein the step of acquiring a state transition matrix for each of said plurality of channels is comprised of the step of generating the state transition matrix.

27. The method of claim 26, wherein the step of acquiring an error matrix for each of said plurality of channels is comprised of the step of generating the error matrix.

28. The method of claim 27, wherein the step of selecting one of the states as the state of the signal is comprised of selecting a state from the group of states consisting of a normal state, a handover state, and a shadow state.

29. The method of claim 28, wherein the step of receiving the signal is comprised of the step of receiving the signal in frames.

30. The method of claim 29, wherein step of receiving the signal is comprised of the step of receiving the signal in real time.

31. The method of claim 30, wherein the step of receiving the signal is comprised of the step of receiving the signal from communications equipment.

32. The method of claim 31, wherein the step of transmitting the signal is comprised of the step of transmitting the signal in real time.

33. The method of claim 32, wherein the step of transmitting the signal is comprised of the step of transmitting the signal to communications equipment.

* * * * *